United States Patent
Chang et al.

(10) Patent No.: US 7,580,357 B2
(45) Date of Patent: Aug. 25, 2009

(54) METHOD FOR IMPLEMENTING VARYING GRADES OF SERVICE QUALITY IN A NETWORK SWITCH

(75) Inventors: Chung-Ping Chang, Taipei (TW);
Chun-Cheng Wang, Taipei (TW);
Ying-Chung Chen, Taipei (TW);
Wei-Pin Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 755 days.

(21) Appl. No.: 11/292,128

(22) Filed: Dec. 1, 2005

(65) Prior Publication Data

US 2007/0127370 A1 Jun. 7, 2007

(51) Int. Cl.
*H04L 1/00* (2006.01)
*H04B 7/212* (2006.01)
*H04J 3/16* (2006.01)

(52) U.S. Cl. .................. 370/235; 370/444; 370/465

(58) Field of Classification Search .................. 370/233, 370/444, 465
See application file for complete search history.

(56) References Cited

U.S. PATENT DOCUMENTS

| | | | |
|---|---|---|---|
| 6,892,309 B2* | 5/2005 | Richmond et al. ............. | 726/7 |
| 6,901,072 B1* | 5/2005 | Wong .......................... | 370/389 |
| 6,975,639 B1 | 12/2005 | Hill et al. | |
| 7,006,486 B1 | 2/2006 | Johansson et al. | |
| 7,263,063 B2* | 8/2007 | Sastry et al. ................. | 370/235 |
| 2006/0067335 A1* | 3/2006 | Maya et al. .................. | 370/397 |
| 2006/0088036 A1* | 4/2006 | De Prezzo ............. | 370/395.53 |
| 2006/0215592 A1* | 9/2006 | Tomoe et al. ................ | 370/315 |
| 2007/0098006 A1* | 5/2007 | Parry et al. .................. | 370/437 |
| 2007/0208876 A1* | 9/2007 | Davis .......................... | 709/240 |
| 2008/0159174 A1* | 7/2008 | Enomoto et al. ............. | 370/256 |

* cited by examiner

*Primary Examiner*—Andrew Lee
(74) *Attorney, Agent, or Firm*—Thomas, Kayden, Horstemeyer & Risley

(57) ABSTRACT

The invention provides a method for implementing varying service quality grades in a network switch. First, a plurality of users of the network switch is classified into a plurality of service quality grades according to a contributing factor of the plurality of users. Each of the plurality of users is then connected to the network switch via one of a plurality of ports of the network switch according to its service quality grade. An original priority of a packet in the network switch is then determined. An adjusted priority of the packet is then determined according to both the original priority of the packet and a priority adjustment table of an ingress port of the packet. Each of the plurality of ports has a corresponding priority adjustment table, and each of the priority adjustment tables includes a mapping relationship between the original priority and the adjusted priority.

18 Claims, 5 Drawing Sheets

| Priority Adjustment Table | |
|---|---|
| original priority level | ajusted priority level |
| 7 | 4 |
| 6 | 4 |
| 5 | 3 |
| 4 | 3 |
| 3 | 2 |
| 2 | 2 |
| 1 | 1 |
| 0 | 0 |

| Priority Adjustment Table | |
|---|---|
| original priority level | ajusted priority level |
| 7 | 7 |
| 6 | 7 |
| 5 | 6 |
| 4 | 6 |
| 3 | 5 |
| 2 | 5 |
| 1 | 5 |
| 0 | 5 |

FIG. 4

METHOD FOR IMPLEMENTING VARYING GRADES OF SERVICE QUALITY IN A NETWORK SWITCH

BACKGROUND OF THE INVENTION

1. Field of the Invention

The present invention relates to network communication, and in particular relates to a network switch.

2. Description of the Related Art

Quality of service (QOS) is a defined level of performance in a data communications system. When data is broken into packets that travel through the same switches or routers in a LAN or WAN with all other data, QoS mechanisms are one method of ensuring quality by giving some data priority over other data. These switches and routers can make the actual determination of which packet has priority with the mechanisms in the network software. The software mechanisms can be based on a real time property of a packet or class of services that are assigned to users based on company policies. For example, IP telephony packets may require higher priority to prevent jitter and delay. The packet priority can also be determined on the basis of service level agreements contracted between a company and users according to the expense the user is charged.

The conventional method checks a specific field of the packet header to determine packet priority. For example, the "type of service" field in the IP header of a packet can be set by a packet sender to notify switches or routers of the data priority. A "user priority" field in the VLAN tag header for IEEE 802.1q is available, and the user priority field can be used to store a priority level of the frame.

However, if those fields in the packet header are the only reference to decide packet priority in a switch or router, the actual packet priority may be misinterpreted or disguised. For example, assume there are two users A and B connecting to the internet backbone via a network switch of an Internet service provider (ISP). If user B is charged higher than user A by the ISP, the network switch should process packets sent from user B at higher priority than packets from user A. However, if user A continues sending packets with a higher value in the "user priority" field than packets from user B, the network switch will process packets from user A with precedence over packets from user B, decreasing profits of the ISP's. Thus, a method for implementing a varying grades of QOS in a network switch is desirable.

BRIEF SUMMARY OF INVENTION

A detailed description is given in the following embodiments with reference to the accompanying drawings.

A method for implementing varying grades of service quality in a network switch is provided. An embodiment of the method comprises the following steps. A plurality of users of the network switch is classified into a plurality of service quality grades. Each of the plurality of users is then connected to the network switch via one of a plurality of ports of the network switch according to its service quality grade, wherein each of the plurality of ports corresponds to one of the plurality of service quality grades. An original priority of a packet in the network switch is then determined, wherein the packet is sent from one of the plurality of users and received by the network switch via an ingress port, and the ingress port is one of the plurality of ports. An adjusted priority of the packet is then determined according to both the original priority of the packet and a priority adjustment table of the ingress port of the packet, wherein each of the plurality of ports has a corresponding priority adjustment table, and each of the priority adjustment tables includes a mapping relationship between the original priority of the packet and the adjusted priority of the packet. A processing order of the packet is then generated according to the adjusted priority of the packet. The packet is then processed in the processing order by the network switch.

A network switch capable of implementing varying grades of service quality is provided. An embodiment of the network switch comprises a plurality of ports, for connecting a plurality of users to the network switch, wherein the plurality of users are classified into a plurality of service quality grades according to a contributing factor of the plurality of users, and each of the plurality of users is connected to the network switch via one of a plurality of ports according to its service quality grade, wherein each of the plurality of ports corresponds to one of the plurality of service quality grades. The network switch also comprises a plurality of priority adjustment tables for storing a mapping relationship between an original priority and an adjusted priority, wherein each of the plurality of ports has a corresponding one of the plurality of priority adjustment tables.

The network switch also comprises a processing order determining module, coupled to the plurality of ports, for determining an original priority of a packet received by the network switch, determining an adjusted priority of the packet according to both the original priority of the packet and an ingress port of the packet, and generating a processing order of the packet according to the adjusted priority of the packet, wherein the packet is sent from one of the plurality of users and received by the network switch via an ingress port, and the ingress port is one of the plurality ports. The network switch also comprises a core module, coupled to the plurality of ports and the processing order determining module, for processing the packet in the processing order.

BRIEF DESCRIPTION OF DRAWINGS

The present invention can be more fully understood by reading the subsequent detailed description and examples with reference made to the accompanying drawings, wherein:

FIG. 4 shows an embodiment of a priority adjustment table according to the invention.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
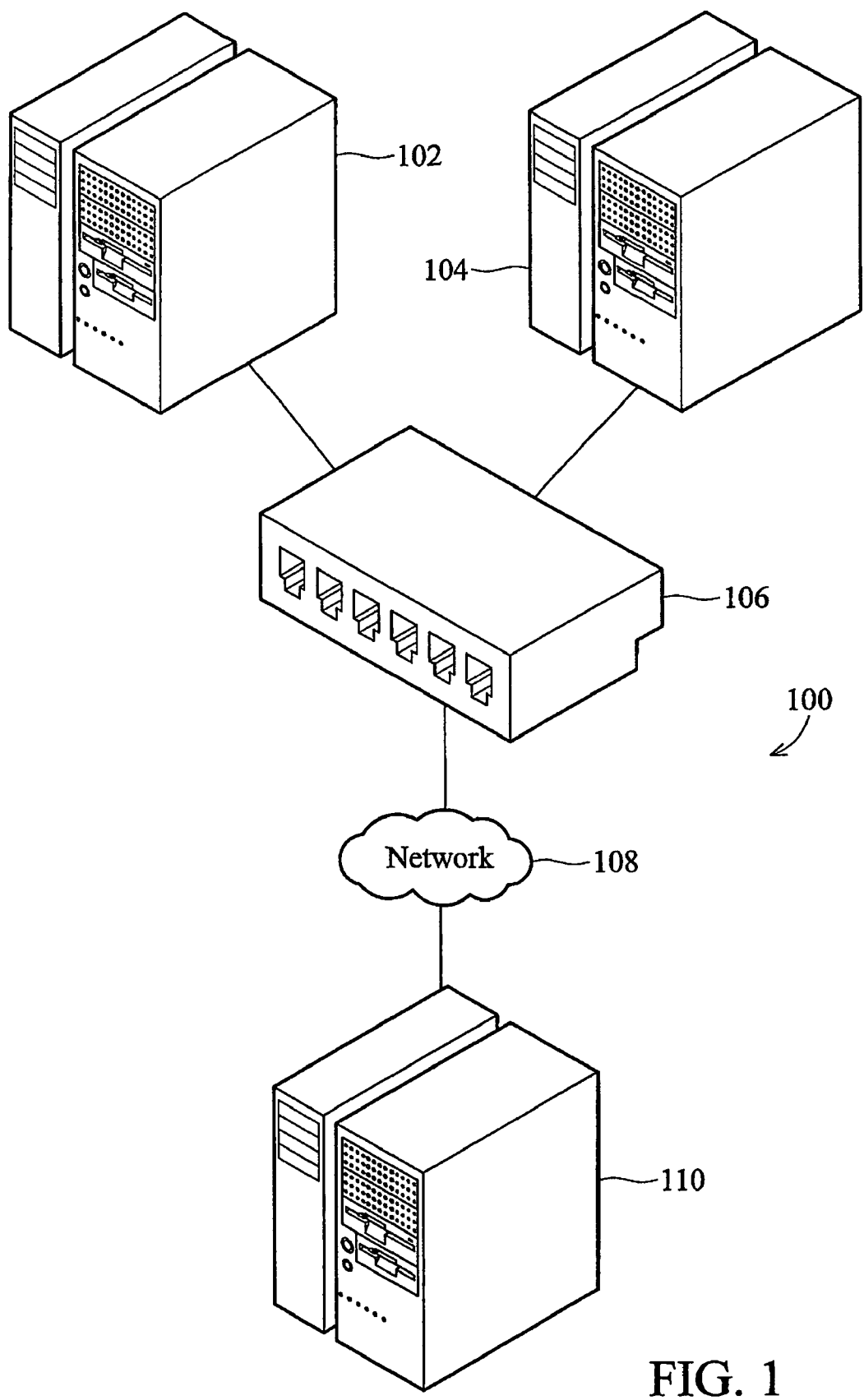
FIG. 1 illustrates an example of network system including a network switch.

FIG. 1 illustrates an example of network system 100 including a network switch 106. Computer 102 is connected to network 108 via network switch 106. Computer 104 is also connected to network 108 via network switch 106. Server 110 is also connected to network 108. Network switch 106 processes packets sent from or to computers 102 and 104, and it processes packets roughly sequentially. However, because the bandwidth of network switch 106 is finite, if network switch 106 receives lots of packets at the same time, it is impossible to process all of the packets and a processing order of the packets must first be determined. Because packets conforming to the IEEE 802.1q standard are attached with a VLAN tag header which contains a 3-bit user priority field to denote the priority level of the packet, network switch 106 can determine the packet processing order according to the user priority field of VLAN packets tag header. Of course, network switch 106 may also determine packet processing order according to other packet field denoting packet priority or packet attributes, or according to a default priority of the ingress port of the packet.

Assume that computer 102 is used by a low contribution customer and that computer 104 is used by a high contribution customer. Thus, if network switch 106 receives packets from computers 102 and 104 of the same priority level at the same time, network switch 106 should process packets from computer 104 before packets from computer 102. However, when a computer keeps sending packets with high priority level to network switch 106, network switch 106 may be deceived and processes packets from computer 102 first. This is a contradictory situation and violates the packet priority based on customer contribution.

Figure 2:
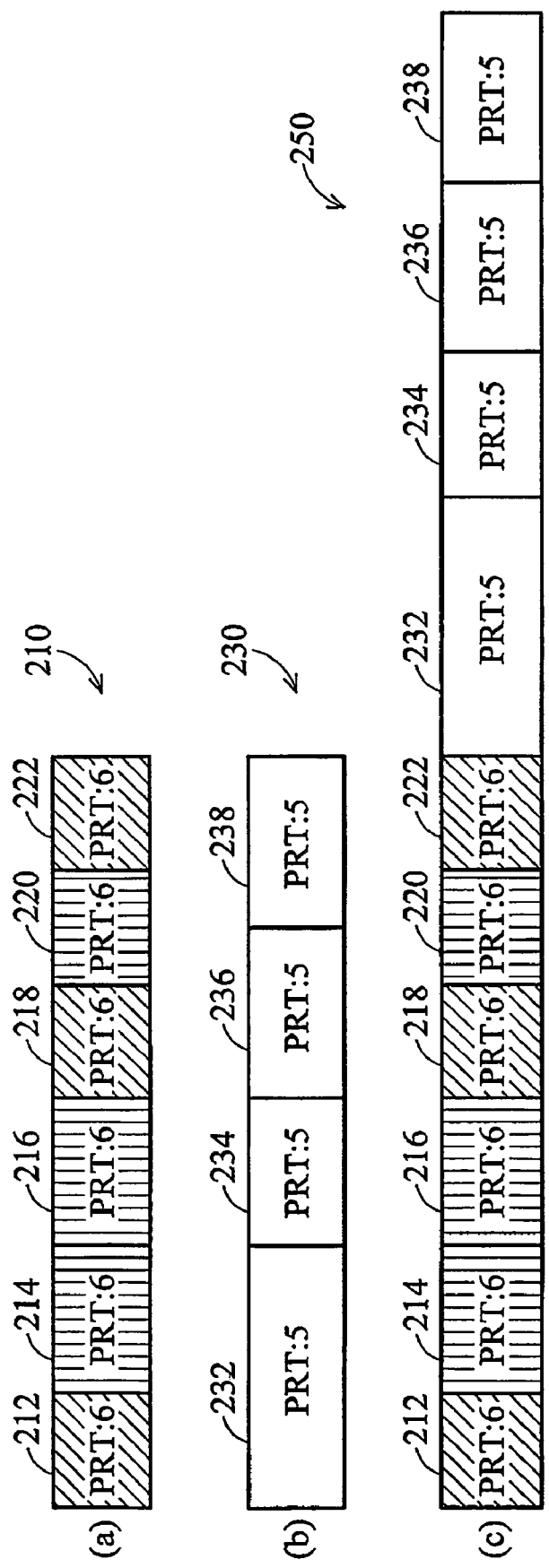
FIG. 2 shows an example of packet processing order in a network switch.

FIG. 2 shows an example of packet processing order 250 in network switch 106 for illustrating the mentioned contradictory situation. Assume that both a low-contributing customer of computer 102 and a high contributing customer of computer 104 need to contact server 110 at the same time. Low contributing computer 102 sends packets 212-222 sequentially to network switch 106, and the priority level of each of packets 212-222 is 6, as illustrated in FIG. 2(a). High-contributing computer 104 sends packets 232-238 sequentially to network switch 106, and the priority level of each of the packets 232-238 is 5, as illustrated in FIG. 2(b). Because packets 212-222 and packets 232-238 arrives at network switch 106 substantially at the same time, both of those packets are stored in memory of network switch 106, and the processing order of those packets must be determined.

Because packets 212-222 are sent from low-contributing computer 102 and packets 232-238 are sent from high-contributing computer 104, network switch 106 should process packets 232-238 from high-contributing computer 104 before packets 212-222 from low-contributing computer 102. However, because network switch 106 considers only packet priority level, packets 212-222 from low-contributing computer 102 with higher priority level 6 will be processed prior to packets 232-238 from high-contributing computer 104 with lower priority level 5. FIG. 2(c) shows the packet processing order 250 of network switch 106, and all of the packets from low-contributing computer 102 are processed earlier than packets from high-contributing computer 104. Thus, packets 212-222 from low-contributing computer 102 will arrive at server 110 earlier than packets 232-238 from high-contributing computer 104. If low-contributing computer 102 continues sending packets with high priority level, packets from high-contributing computer 104 will always be delayed, and the resulting network performance is inverse to the customer contribution.

Figure 3:
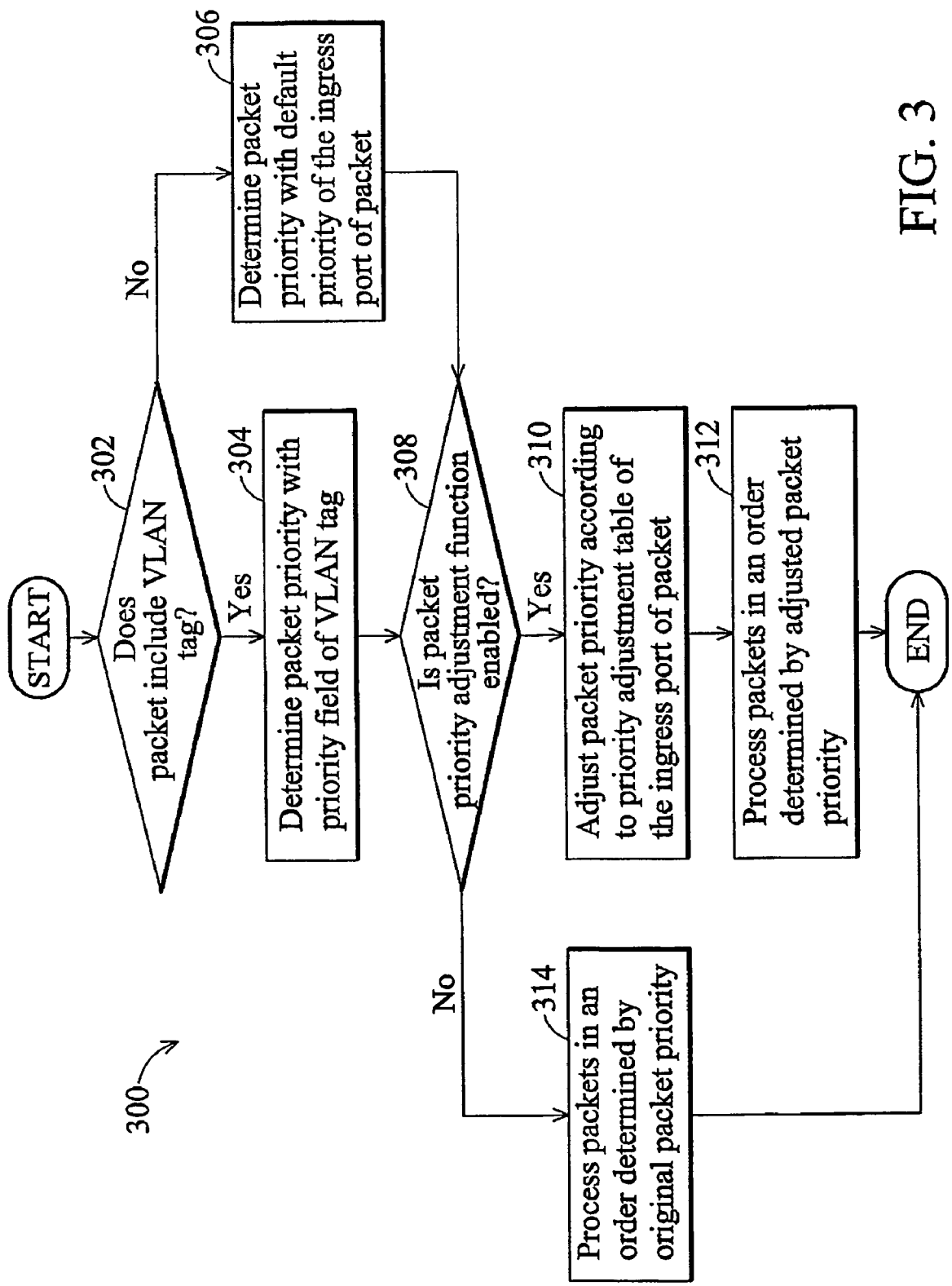
FIG. 3 shows an embodiment of a method for implementing varying grades of service quality in a network switch according to the invention.

FIG. 3 shows an embodiment of a method 300 for implementing varying grades of service quality in a network switch according to this invention. Method 300 can be executed by a processing order determining module of network switch 106 for determining packet processing order before packets are forwarded to an adequate egress port by a core module of network switch 106. Because method 300 considers not only packet priority but also customer contribution to determine packet processing order, it can avoid the problem of assigning higher processing precedence to lower contribution customers.

Method 300 begins with step 302 to determine whether the received packet contains a VLAN tag header. If the received packet contains a VLAN tag header, the packet priority can be determined with the user priority field of the VLAN tag header in step 304. Otherwise, if the received packet does not contain a VLAN tag header in step 302, the packet priority can be determined with default priority of the ingress port of the packet in step 306. Because the packet priority has been determined, network switch 106 must decide a processing order of the packet. If the priority adjustment function is disabled in step 308, a processing order of the packet can be determined according to the original packet priority in step 314, and network switch 106 can process packets in the packet processing order of step 314.

Otherwise, if the priority adjustment function is enabled in step 308, an adjusted packet priority can be determined according to a priority adjustment table of the ingress port of the packet in step 310. The priority adjustment table specifies the mapping relationship between the original priority level and the adjusted priority level of the packet received from the ingress port. If customer computers are classified and connected to different ports according to their contribution level, packets priority can be adjusted according to their ingress ports, and the priority adjustment table of the ports reflects the raised or lowered packet priority level according to the contribution grade of the port. A processing order of the packet can then be determined according to the adjusted packet priority in step 312, and network switch 106 can then process packets in the packet processing order of step 312.

FIG. 4 shows an embodiment of priority adjustment table 400 in step 310 of method 300 according to this invention. Priority adjustment table 400 specifies the mapping relationship between the original priority level and the adjusted priority level of all ports of network switch 106, but only the mapping relationship of the two ports connected to low-contributing computer 102 and high-contributing computer 104 are detailed here as an example. Priority adjustment table 410 specifies the mapping relationship of the port connected to low-contributing computer 102. Because the user priority field of the VLAN tag header is only 3-bits long, it can only represent 8 priority levels. When original priority level 412 of packet received from the low-contributing port are 7, 6, 5, 4, 3, 2, 1 and 0, an adjusted priority level 414 is generated as 4, 4, 3, 3, 2, 2, 1, and 0 as a reference to determine the packet processing order in step 312. Priority adjustment table 420 specifies the mapping relationship of the port connected to high-contributing computer 104. When original priority level 422 of the packet received from the high-contributing port are 7, 6, 5, 4, 3, 2, 1, and 0, an adjusted priority level 424 is generated as 7, 7, 6, 6, 5, 5, 5, and 5 as a reference to determine the packet processing order in step 312.

Priority table 410 of the low-contributing port shows that the adjusted priority level 414 is lower than the original priority level 412, and priority table 420 of the high-contributing port shows that the adjusted priority level 424 is higher than the original priority level 422. Thus, the priority level of packets from low-contributing computer 102 will be lowered, and the priority level of packets from high-contributing computer 104 will be raised. If network switch 106 processes packets in the processing order determined by the adjusted priority level, the packets from low-contributing computer 102 will be processed later than the packets from high-contributing computer 104.

Figure 5:
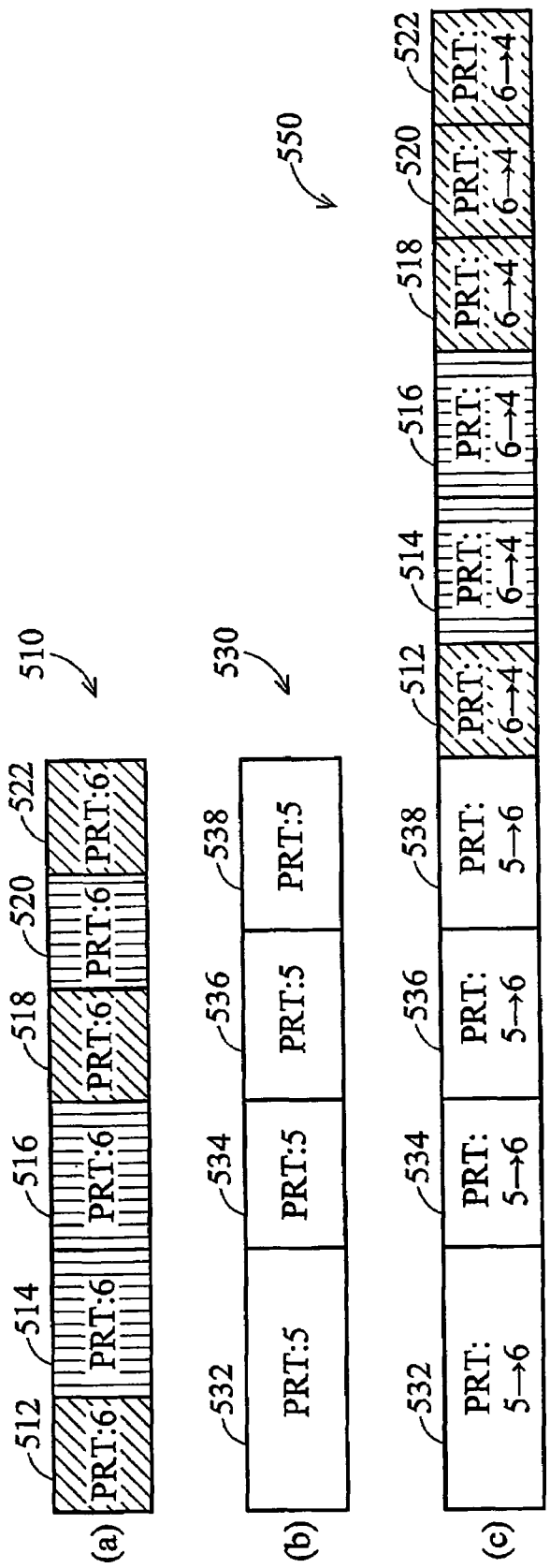
FIG. 5 shows an example of a packet processing order in a network switch after the network switch adopts the method in FIG. 3 for implementing varying grades of service quality according to the invention.

FIG. 5 shows an example of the packet processing order 550 after network switch 106 adopts method 300 for implementing varying grades of service quality according to this invention. Assume that both low-contributing customer of computer 102 and high contributing customer of computer 104 need to contact server 110 at the same time. Low contributing computer 102 sends packets 512-522 to network switch 106 sequentially, and the priority level of each packet 512-522 is 6, as illustrated in FIG. 5(a). High contributing computer 104 sends packets 532-538 to network switch 106 sequentially, and the priority level of each packet 532-538 is 5, as illustrated in FIG. 5(b). Because packets 512-522 and packets 532-538 arrive at network switch 106 substantially at the same time, both of those packets are stored in memory of network switch 106, and the processing order of those packets must be determined.

Because packets 512-522 are sent from low-contributing computer 102 and packets 532-538 are sent from high-contributing computer 104, network switch 106 should process packets 532-538 from high-contributing computer 104 before packets 512-522 from low-contributing computer 102. Because network switch 106 adopts method 300 to adjust packet priority according to the contribution grade of the packet ingress port, network switch 106 can consider both packet priority level and customer contribution level to determine packet processing order Thus, although packets 512-522 from low-contributing computer 102 have higher original priority level 6 and packets 532-538 from high-contributing computer 104 have lower original priority level 5, the original priority level of all of the packets will not be taken as a direct determinant. An adjusted priority level of 6 of the packets 532-538 is generated according to priority adjustment table 420, and an adjusted priority level of 4 of packets 512-522 is generated according to priority adjustment table 410. A processing order 550 of the packets 512-522 and 532-538 is then determined according to the adjusted packet priority level, and network switch 108 will process packets 512-522 and 532-538 in the processing order 550. FIG. 5(c) shows the packet processing order 550 of network switch 106, and all of the packets from low-contributing computer 102 are processed later than packets from high-contributing computer 104. Thus, packets 532-538 from high-contributing computer 104 will arrive at server 110 earlier than packets 512-522 from low-contributing computer 102. Packets from high-contributing computer 104 will always take precedence over packets from low-contributing computer 102 even if low-contributing computer 102 continues sending packets with high priority level, and the resulting network performance is in proportion to the customer contribution.

In this disclosure, we provide a method for implementing varying grades of service quality in a network switch. An adjusted priority level of packets is generated according to not only the original packet priority but also customer contribution. A packet processing order is then determined by the adjusted priority level of packets, and the network switch process packets in the packet processing order. Thus, packets from a high-contributing customer will always take precedence over packets from a low-contributing customer, and the resulting network performance is in proportion to the customer contribution.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for implementing varying service quality grades in a network switch, comprising the steps of:
    classifying a plurality of users of the network switch into a plurality of service quality grades according to a contributing factor of the plurality of the users;
    connecting each of the plurality of users to the network switch via one of a plurality of ports of the network switch according to its service quality grade, wherein each of the plurality of ports corresponds to one of the plurality of service quality grades;
    determining an original priority of a packet in the network switch, wherein the packet is sent from one of the plurality of users and received by the network switch via an ingress port, and the ingress port is one of the plurality of ports; and
    determining an adjusted priority of the packet according to both the original priority of the packet and a priority adjustment table of the ingress port of the packet;
    wherein each of the plurality of ports has a corresponding priority adjustment table, and each of the priority adjustment tables includes a mapping relationship between the original priority of the packet and the adjusted priority of the packet.

2. The method for implementing varying service quality grades in a network switch as claimed in claim 1, further comprising the steps of:
    generating a processing order of the packet according to the adjusted priority of the packet; and
    processing the packet in the processing order by the network switch.

3. The method for implementing varying service quality grades in a network switch as claimed in claim 1, wherein the original priority of the packet is determined with a user priority field of a virtual local area network (VLAN) tag header of the packet.

4. The method for implementing varying service quality grades in a network switch as claimed in claim 3, wherein the original priority of the packet is determined with a default priority of the ingress port of the packet if the packet does not include a VLAN tag header.

5. The method for implementing varying service quality grades in a network switch as claimed in claim 1, wherein the mapping relationship of the priority adjustment table of the ingress port generates the adjusted priority by raising the original priority when the ingress port corresponds to a high service quality grade, and the mapping relationship of the priority adjustment table of the ingress port generates the adjusted priority by lowering the original priority when the ingress port corresponds to a low service quality grade.

6. The method for implementing varying service quality grades in a network switch as claimed in claim 1, wherein the priority adjustment table includes an original priority level column and an adjusted priority level column for defining the mapping relationship between the original priority of the packet and the adjusted priority of the packet.

7. The method for implementing varying service quality grades in a network switch as claimed in claim 2, wherein the processing order of the packet is earlier if the adjusted priority of the packet is higher in the generating step.

8. The method for implementing varying service quality grades in a network switch as claimed in claim 2, wherein the processing step includes deciding an adequate egress port of the packet and forwarding the packet to the egress port.

9. The method for implementing varying service quality grades in a network switch as claimed in claim 3, wherein the VLAN tag header confirms to the IEEE 802.11q standard.

10. A network switch capable of implementing varying service quality grades, comprising:
- a plurality of ports, for connecting a plurality of users to the network switch, wherein the plurality of users are classified into a plurality of service quality grades according to a contributing factor of the plurality of users, and each of the plurality of users is connected to the network switch via one of a plurality of ports according to its service quality grade, wherein each of the plurality of ports corresponds to one of the plurality of service quality grades;
- a plurality of priority adjustment tables, for storing a mapping relationship between an original priority and an adjusted priority, wherein each of the plurality of ports has a corresponding one of the plurality of priority adjustment tables; and
- a processing order determining module, coupled to the plurality of ports, for determining an original priority of a packet received by the network switch, determining an adjusted priority of the packet according to both the original priority of the packet and a priority adjustment table corresponding to an ingress port of the packet, and generating a processing order of the packet according to the adjusted priority of the packet, wherein the packet is sent from one of the plurality of users and received by the network switch via an ingress port, and the ingress port is one of the plurality ports.

11. The network switch capable of implementing varying service quality grades as claimed in claim 10, further comprises a core module, coupled to the plurality of ports and the processing order determining module, for processing the packet in the processing order.

12. The network switch capable of implementing varying service quality grades as claimed in claim 10, wherein the processing order determining module determines the original priority of the packet with a user priority field of a virtual local area network (VLAN) tag header of the packet.

13. The network switch capable of implementing varying service quality grades as claimed in claim 12, wherein the processing order determining module determines the original priority of the packet with a default priority of the ingress port of the packet if the packet does not include a VLAN tag header.

14. The network switch capable of implementing varying service quality grades as claimed in claim 10, wherein the adjusted priority of the priority adjustment table of the ingress port is defined by raising the original priority when the ingress port corresponds to a high service quality grade, and the adjusted priority of the priority adjustment table of the ingress port is defined by lowering the original priority when the ingress port corresponds to a low service quality grade.

15. The network switch capable of implementing varying service quality grades as claimed in claim 10, wherein the priority adjustment table includes an original priority level column and an adjusted priority level column for defining the mapping relationship between the original priority of the packet and the adjusted priority of the packet.

16. The network switch capable of implementing varying service quality grades as claimed in claim 10, wherein the processing order determining module determines an earlier processing order of the packet if the adjusted priority of the packet is higher.

17. The network switch capable of implementing varying service quality grades as claimed in claim 11, wherein the core module decides an adequate egress port of the packet and forwards the packet to the egress port in the processing order.

18. The network switch capable of implementing varying service quality grades as claimed in claim 12, wherein the VLAN tag header confirms to the IEEE 802.11q standard.

* * * * *